(12) United States Patent
Aso et al.

(10) Patent No.: US 11,984,770 B2
(45) Date of Patent: May 14, 2024

(54) ROTOR, MOTOR, FAN, AIR CONDITIONING APPARATUS, AND METHOD FOR MANUFACTURING ROTOR

(71) Applicant: Mitsubishi Electric Corporation, Tokyo (JP)

(72) Inventors: Hiroki Aso, Tokyo (JP); Takaya Shimokawa, Tokyo (JP); Junichiro Oya, Tokyo (JP); Naoki Tamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 715 days.

(21) Appl. No.: 17/254,265

(22) PCT Filed: Aug. 2, 2018

(86) PCT No.: PCT/JP2018/029008
§ 371 (c)(1),
(2) Date: Dec. 19, 2020

(87) PCT Pub. No.: WO2020/026406
PCT Pub. Date: Feb. 6, 2020

(65) Prior Publication Data
US 2021/0273528 A1 Sep. 2, 2021

(51) Int. Cl.
*H02K 7/08* (2006.01)
*F24F 1/20* (2011.01)
(Continued)

(52) U.S. Cl.
CPC ............. *H02K 11/215* (2016.01); *F24F 1/20* (2013.01); *H02K 1/2733* (2013.01); *H02K 7/083* (2013.01); *H02K 15/03* (2013.01); *H02K 21/14* (2013.01)

(58) Field of Classification Search
CPC ........ H02K 21/14; H02K 21/22; H02K 21/16; H02K 2213/03; H02K 1/2733; H02K 1/27;
(Continued)

(56) References Cited

U.S. PATENT DOCUMENTS 11,658,526 B2 * 5/2023 Aso .................. H02K 5/08
310/156.06
2011/0273037 A1 11/2011 Ota et al.
(Continued)

FOREIGN PATENT DOCUMENTS

JP    H02-311147 A    12/1990
JP    H11-146618 A    5/1999
(Continued)

OTHER PUBLICATIONS

Office Action dated Feb. 14, 2023 in corresponding JP Patent Application No. 2020-533992 (with machine English translation).
(Continued)

*Primary Examiner* — Bryan R Perez
(74) *Attorney, Agent, or Firm* — POSZ LAW GROUP, PLC

(57) ABSTRACT

A rotor includes: a resin magnet including a first magnetic flux generating part and a second magnetic flux generating part; and a shaft fixed to the resin magnet. The first magnetic flux generating part has a first orientation. The second magnetic flux generating part has a second orientation different from the first orientation in a radial direction. A peak of magnetic flux density from the first magnetic flux generating part is larger than a peak of magnetic flux density from the second magnetic flux generating part.

21 Claims, 9 Drawing Sheets

(51) Int. Cl.
  *H02K 1/2733* (2022.01)
  *H02K 11/215* (2016.01)
  *H02K 15/03* (2006.01)
  *H02K 21/14* (2006.01)

(58) Field of Classification Search
  CPC .......... H02K 1/2791; H02K 1/28; H02K 1/20; H02K 1/276; H02K 1/278; H02K 1/2792; H02K 5/08
  See application file for complete search history.

(56) References Cited

U.S. PATENT DOCUMENTS

| | | | | |
|---|---|---|---|---|
| 2016/0233747 | A1* | 8/2016 | Aso | .......................... H02K 15/02 |
| 2019/0028009 | A1 | 1/2019 | Shimokawa et al. | |

FOREIGN PATENT DOCUMENTS

| | | | |
|---|---|---|---|
| JP | H11-299207 | A | 10/1999 |
| JP | 2000-201461 | A | 7/2000 |
| JP | 2000-287430 | A | 10/2000 |
| JP | 2000-324785 | A | 11/2000 |
| JP | 3236578 | B2 | 12/2001 |
| JP | 3748037 | B2 | 2/2006 |
| JP | 2008245488 | A * | 10/2008 |
| JP | 2011-239546 | A | 11/2011 |
| JP | 2013-162697 | A | 8/2013 |
| JP | 2013-219896 | A | 10/2013 |
| WO | 2017/046953 | A1 | 3/2017 |

OTHER PUBLICATIONS

Office Action dated Sep. 14, 2021, issued in corresponding JP Patent Application No. 2020-533992 (and English Machine Translation).
Office Action dated Sep. 13, 2022 in connection with counterpart Japanese Patent Application No. 2020-533992 (and English machine translation).
International Search Report of the International Searching Authority dated Oct. 30, 2018 for the corresponding International application No. PCT/JP2018/029008 (and English translation).
Office Action dated Mar. 22, 2022, issued in corresponding JP Patent Application No. 2020-533992 (and English Machine Translation).
Office Action issued Mar. 19, 2024 in connection with counterpart Japanese Patent Application No. 2020-533992 (and English machine translation).

* cited by examiner ial Patent Application No. PCT/JP2018/029008
ROTOR, MOTOR, FAN, AIR CONDITIONING APPARATUS, AND METHOD FOR MANUFACTURING ROTOR

CROSS REFERENCE TO RELATED APPLICATION

This application is a U.S. national stage application of International Patent Application No. PCT/JP2018/029008 filed on Aug. 2, 2018, the disclosure of which is incorporated herein by reference.

TECHNICAL FIELD

The present invention relates to a rotor of a motor.

BACKGROUND

A proposed resin magnet for use in a rotor of a motor includes a main magnetic pole part and a sensor magnetic pole part for detecting a rotation position of the rotor (see, for example, Patent Reference 1). In the rotor described in Patent Reference 1, the outer diameter of the sensor magnetic pole part is smaller than the inner diameter of the main magnetic pole part, thereby reducing a magnet volume. In this manner, costs for the rotor and the motor can be reduced.

PATENT REFERENCE

Patent Reference 1: Japanese Patent Application Publication No. 2000-324785

In general, in a case where distribution of magnetic flux from a rotor in a rotation direction is a sine wave, torque ripples decrease and thus motor noise can be reduced. The case where the distribution (i.e., a waveform of detected values) of magnetic flux flowing into a position detection element for detecting a rotation position of the rotor is a sine wave, however, has a problem of poor accuracy in detecting the rotation position of the rotor. On the other hand, as in the rotor described in Patent Reference 1, in a case where an orientation (also referred to as a magnetic field orientation) of a sensor magnetic pole part is isotropic, the magnetic flux from the rotor does not easily flow into the position detection element and thus there is a problem in that the accuracy of detection of the rotation position of the rotor is poor. It is, therefore, difficult for conventional techniques to achieve both reduction of motor noise and enhancement of the accuracy of detection of the rotation position of the rotor.

SUMMARY

It is an object of the present invention to provide a rotor capable of reducing motor noise and enhancing accuracy of detection of a rotation position of the rotor.

A rotor according to the present invention includes: a resin magnet including a first magnetic flux generating part having a polar anisotropic orientation and a second magnetic flux generating part having a radial orientation or an axial orientation; and a shaft fixed to the resin magnet. A peak of magnetic flux density from the first magnetic flux generating part is larger than a peak of magnetic flux density from the second magnetic flux generating part.

The present invention provides a rotor capable of reducing motor noise and enhancing accuracy of detection of a rotation position of the rotor.

DETAILED DESCRIPTION

First Embodiment

Figure 1:
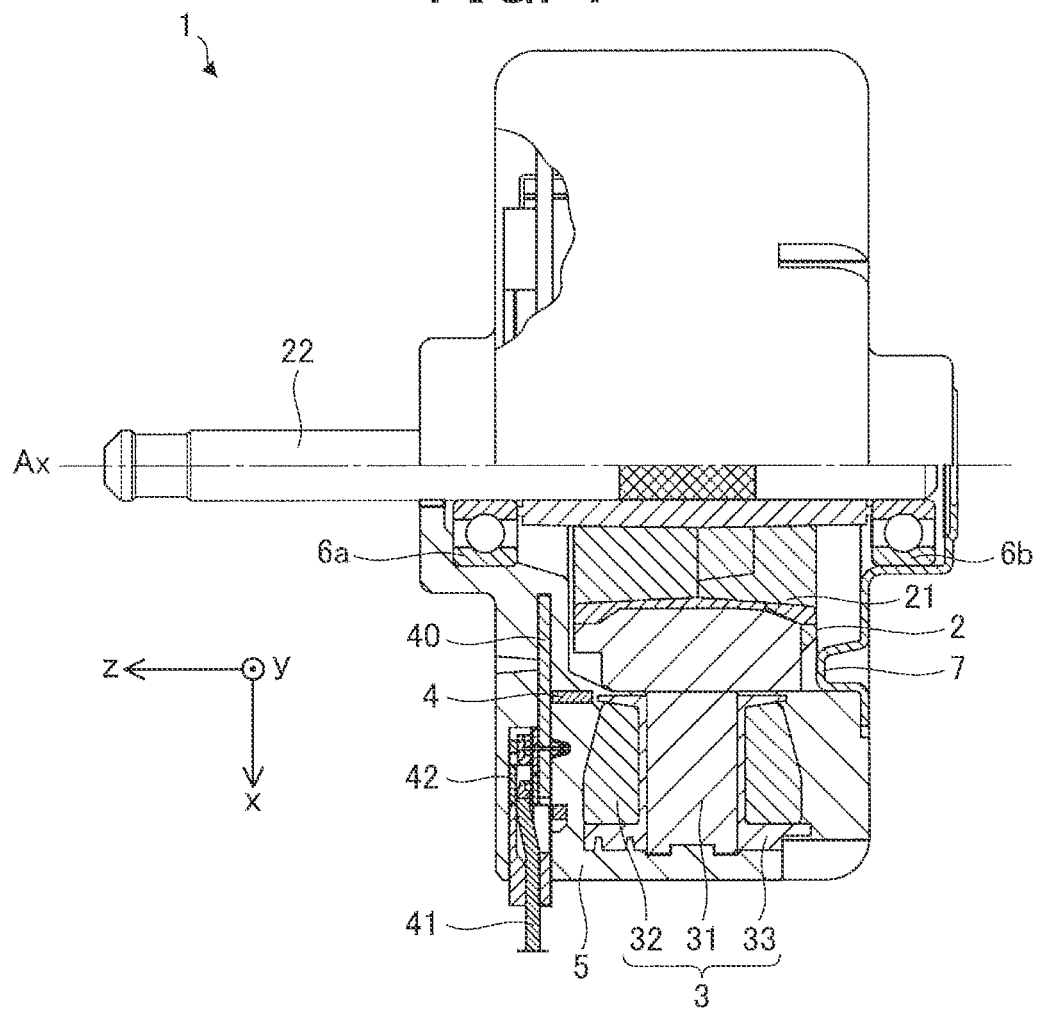
FIG. 1 is a partial cross-sectional view schematically illustrating a structure of a motor according to a first embodiment of the present invention.

In xyz orthogonal coordinate systems illustrated in the drawings, a z-axis direction (z axis) represents a direction parallel to an axis line Ax of a motor 1, an x-axis direction (x axis) represents a direction orthogonal to the z-axis direction (z axis), and a y-axis direction (y axis) is a direction orthogonal to both the z-axis direction and the x-axis direction. The axis Ax is a rotation center of the rotor 2. The direction parallel to the axis line Ax is also referred to as an "axial direction of the rotor 2" or simply an "axial direction." A radial direction is a direction orthogonal to the axis line Ax. The "circumferential direction" refers to a circumferential direction of the rotor 2 and a resin magnet 21 about the axis line Ax.

FIG. 1 is a partial cross-sectional view schematically illustrating a structure of the motor 1 according to a first embodiment of the present invention.

The motor 1 includes the rotor 2, a stator 3, and a position detection element 4 (also referred to as a magnetic pole position detection element). The motor 1 is also referred to as a molded motor.

In the example illustrated in FIG. 1, the motor 1 also includes a printed wiring board 40, a driving circuit 42, a resin 5, bearings 6a and 6b, and a bracket 7.

The motor 1 is, for example, a permanent magnet motor such as a permanent magnet synchronous motor. It should be noted that the motor 1 is not limited to the permanent magnet motor.

Figure 2:
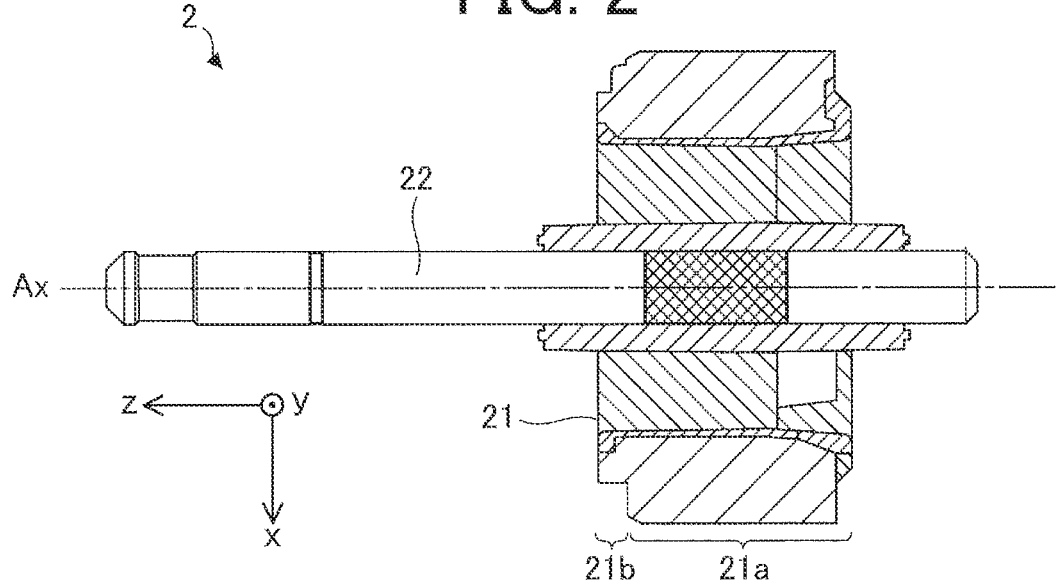
FIG. 2 is a partial cross-sectional view schematically illustrating a structure of a rotor.

FIG. 2 is a partial cross-sectional view schematically illustrating a structure of the rotor 2.

The rotor 2 includes a resin magnet 21 and a shaft 22. The rotor 2 is rotatable about a rotation axis (i.e., the axis line Ax). The rotor 2 is rotatably disposed inside the stator 3 with a gap in between. The shaft 22 is fixed to the resin magnet 21. The bearings 6a and 6b rotatably support both ends of the shaft 22 of the rotor 2.

The resin magnet 21 is formed by mixing magnetic particles of, for example, ferrite or samarium-iron-nitrogen with a thermoplastic resin such as Nylon 12 or Nylon 6.

The resin magnet 21 is longer than the stator 3 in the axial direction. Accordingly, motor efficiency can be increased.

Figure 3:
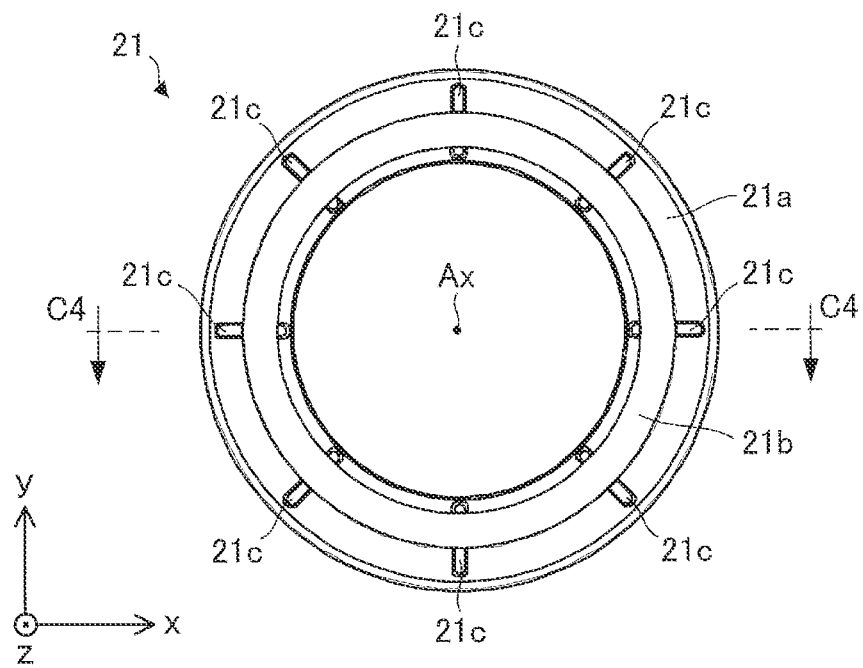
FIG. 3 is a top view schematically illustrating a structure of a resin magnet.

FIG. 3 is a top view schematically illustrating a structure of the resin magnet 21.

Figure 4:
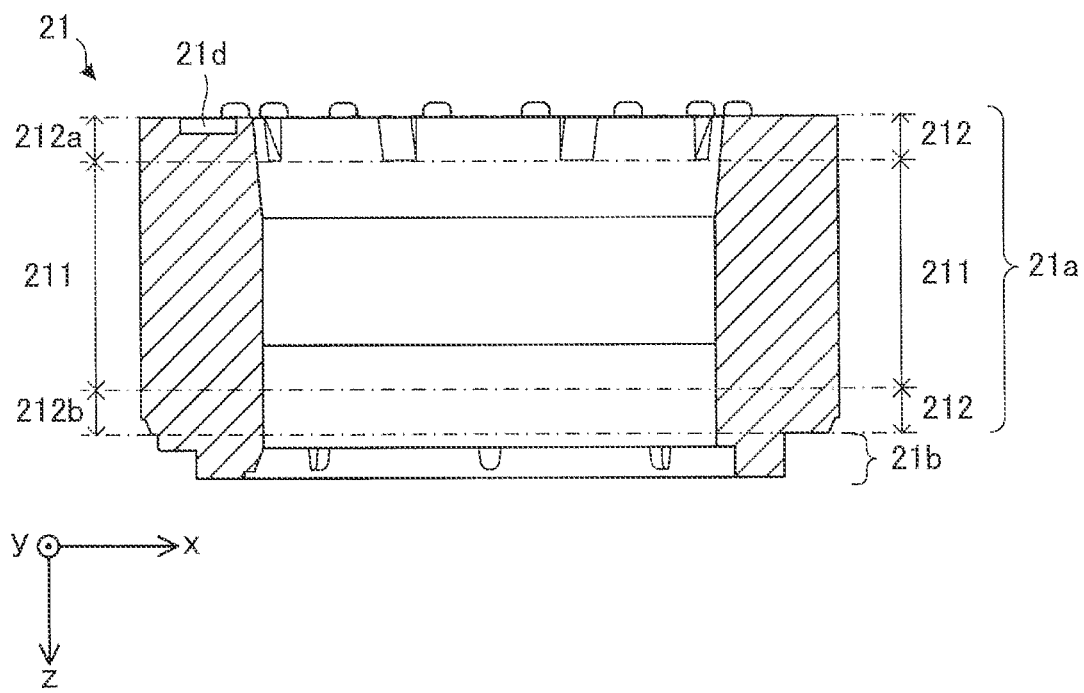
FIG. 4 is a cross-sectional view of the resin magnet taken along a line C4-C4 in FIG. 3.
Figure 5:
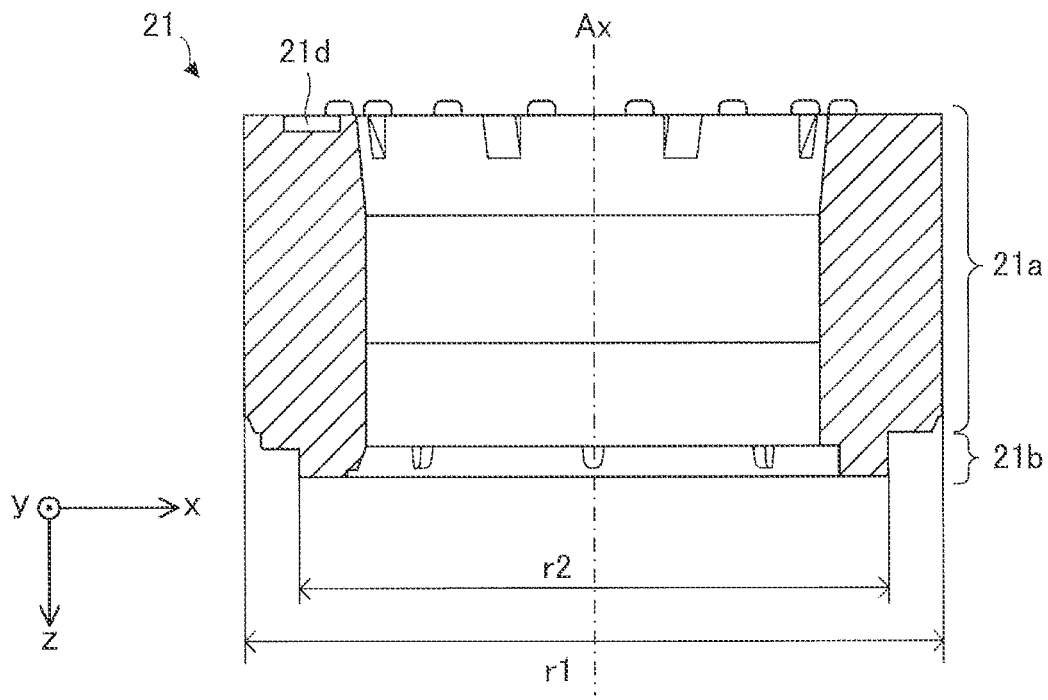
FIG. 5 is a cross-sectional view of the resin magnet taken along the line C4-C4 in FIG. 3.

FIGS. 4 and 5 are cross-sectional views of the resin magnet 21 taken along a line C4-C4 in FIG. 3.

The resin magnet 21 includes a main magnetic flux generating part 21a serving as a first magnetic flux generating part and a position detection magnetic flux generating part 21b serving as a second magnetic flux generating part. The main magnetic flux generating part 21a and the position detection magnetic flux generating part 21b have different orientations.

As illustrated in FIG. 4, the main magnetic flux generating part 21a includes a facing region 211 and a non-facing region 212. The facing region 211 faces the stator core 31 in the radial direction while the resin magnet 21 is disposed inside the stator core 31 of the motor 1. The non-facing region 212 does not face the stator core 31 in the radial direction while the resin magnet 21 is disposed inside the stator core 31 of the motor 1.

As illustrated in FIG. 4, the non-facing region 212 includes a first region 212a and a second region 212b. The first region 212a is located on a side opposite to the position detection magnetic flux generating part 21b in the axial direction. The second region 212b is located between the position detection magnetic flux generating part 21b and the facing region 211 in the axial direction.

Figure 6:
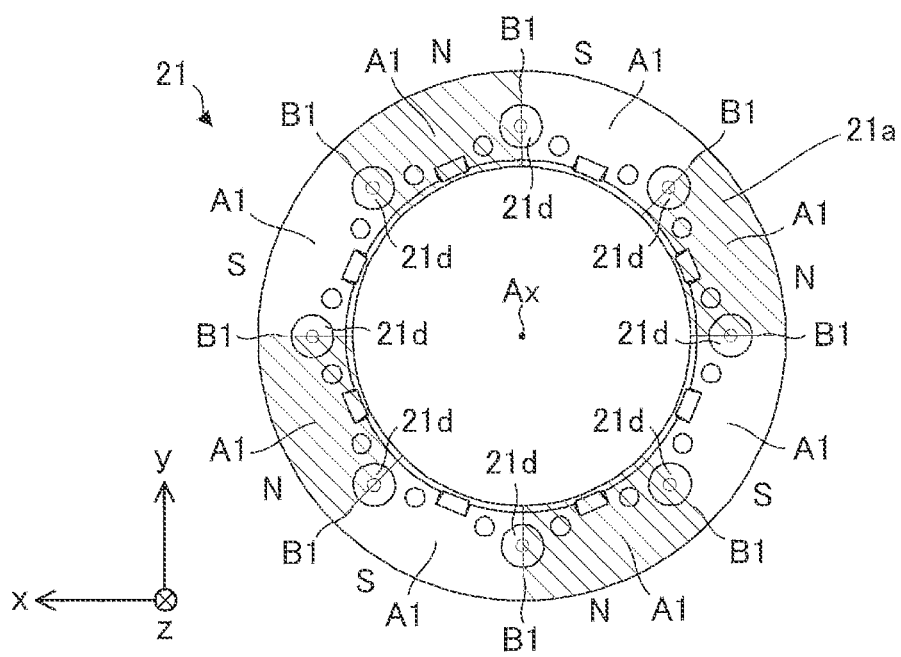
FIG. 6 is a bottom view schematically illustrating a structure of the resin magnet.

FIG. 6 is a bottom view schematically illustrating a structure of the resin magnet 21.

Figure 7:
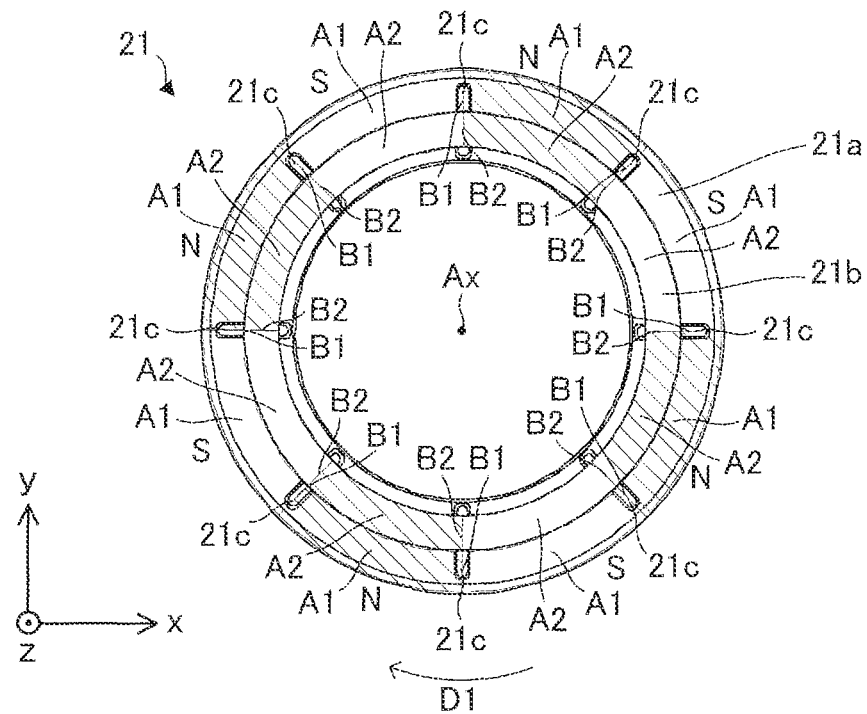
FIG. 7 is a diagram illustrating magnetic poles of the rotor.

FIG. 7 is a diagram illustrating magnetic poles of the rotor 2, specifically the resin magnet 21. In FIGS. 6 and 7, "N" represents a north pole, and "S" represents a south pole.

In the example illustrated in FIGS. 6 and 7, hatched portions of the resin magnet 21 serve as north poles, and unhatched portions of the resin magnet 21 serve as south poles.

The resin magnet 21 has magnetic field orientations of two different types, specifically, a first orientation R1 and a second orientation R2 that are different from each other. More specifically, the resin magnet 21 includes a main magnetic flux generating part 21a serving as a first magnetic flux generating part having the first orientation R1 and a position detection magnetic flux generating part 21b serving as a second magnetic flux generating part having the second orientation R2 different from the first orientation R1 in the radial direction (i.e., an xy plane).

The main magnetic flux generating part 21a includes a first magnetic pole center A1 and a first inter-pole part B1. The first magnetic pole center A1 will also be referred to simply as a magnetic pole center. The first inter-pole part B1 will also be referred to simply as an inter-pole part. The position detection magnetic flux generating part 21b includes a second magnetic pole center A2 and a second inter-pole part B2. The second magnetic pole center A2 will also be referred to simply as a magnetic pole center. The second inter-pole part B2 will also be referred to simply as an inter-pole part.

The magnetic pole center refers to the center of a magnetic pole of the resin magnet 21, for example, the center of a north pole or the center of a south pole. That is, the first magnetic pole center A1 refers to the center of a magnetic pole of the main magnetic flux generating part 21a, and the second magnetic pole center A2 refers to the center of a magnetic pole of the position detection magnetic flux generating part 21b.

The inter-pole part is a boundary between a north pole and a south pole. That is, the first inter-pole part B1 is a boundary between the north pole and the south pole of the main magnetic flux generating part 21a, and the second inter-pole part B2 is a boundary between the north pole and the south pole of the position detection magnetic flux generating part 21b.

In the examples illustrated in FIGS. 3 through 7, the main magnetic flux generating part 21a has a cylindrical shape, and the position detection magnetic flux generating part 21b also has a cylindrical shape.

The position detection magnetic flux generating part 21b is located at an end portion of the resin magnet 21 in the axial direction so as to face the position detection element 4. Accordingly, the position detection magnetic flux generating part 21b is located between the main magnetic flux generating part 21a and the position detection element 4.

The inner surface of the main magnetic flux generating part 21a or the position detection magnetic flux generating part 21b may have a projection to be engaged with the shaft 22 (e.g., a groove formed on the surface of the shaft 22). In this manner, displacement of the resin magnet 21 can be avoided.

As illustrated in FIGS. 4 through 6, the resin magnet 21 includes at least one gate part 21d. The gate part 21d will also be referred to simply as a "gate."

In the example illustrated in FIGS. 4 through 6, the gate part 21d is formed in an end portion of the resin magnet 21 in the axial direction. Specifically, the gate part 21d is formed in each first inter-pole part B1. The position detection magnetic flux generating part 21b is located on a side opposite to the gate part 21d in the axial direction. Accordingly, the first orientation R1 and the second orientation R2 can be distinguished significantly.

The gate part 21d is a gate mark formed at a gate position in a die in the process of molding the resin magnet 21 using the die. In the example illustrated in FIGS. 4 through 6, the gate part 21d is a depression. Accordingly, the first orientation R1 and the second orientation R2 that are different from each other can be formed easily.

In addition, the gate parts 21d may be formed at both ends of the resin magnet 21 in the axial direction. In this case, positions of the gate parts 21d formed at both ends of the resin magnet 21 are different from each other in the circumferential direction. Accordingly, the first orientation R1 and the second orientation R2 that are different from each other can be formed more easily.

As illustrated in FIGS. 3 and 7, the resin magnet 21 has at least one projection 21c projecting toward the position detection element 4. In the example illustrated in FIGS. 3 and 7, the resin magnet 21 has a plurality of projections 21c. Each of the projections 21c is formed at a position that coincides with the position of the second inter-pole part B2 in the circumferential direction.

Accordingly, when the second inter-pole part B2 of the resin magnet 21 passes by the position detection element 4, the orientation of the magnetic flux flowing into the position detection element 4 can be changed abruptly. That is, it is possible to enhance the accuracy of detection of the second inter-pole part B2 (i.e., a point of change from the north pole to the south pole or from the south pole to the north pole) detected by the position detection element 4. As a result, the accuracy of detection of the rotation position of the rotor 2 (specifically, the resin magnet 21) can be enhanced.

As illustrated in FIG. 5, supposing the outer diameter of the main magnetic flux generating part 21a is r1 and the outer diameter of the position detection magnetic flux generating part 21b is r2, the relationship between r1 and r2 satisfies r1≥r2. Accordingly, in the magnetization process on the main magnetic flux generating part 21a, it is possible to prevent magnetization of the position detection magnetic flux generating part 21b by a permanent magnet Mg1 (see FIG. 12 described later) for magnetizing the main magnetic flux generating part 21a. That is, in the magnetization process on the main magnetic flux generating part 21a, the influence on the orientation (i.e., the second orientation R2) of the position detection magnetic flux generating part 21b can be reduced. As a result, the accuracy of detection of the magnetic flux from the position detection magnetic flux generating part 21b, that is, the accuracy of detection of the rotation position of the rotor 2 (specifically, the resin magnet 21) can be enhanced.

In addition, the relationship between r1 and r2 preferably satisfies r1>r2. In this manner, in the magnetization process on the main magnetic flux generating part 21a, the influence on the orientation of the position detection magnetic flux generating part 21b can be further reduced. As a result, the accuracy of detection of the magnetic flux from the position detection magnetic flux generating part 21b can be further enhanced.

Figure 8:
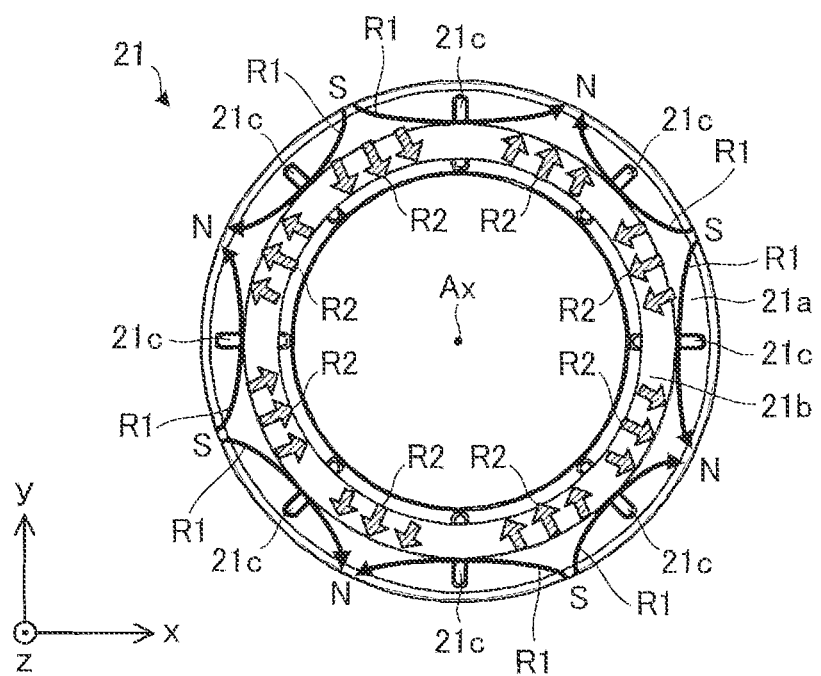
FIG. 8 is a diagram illustrating a first orientation and a second orientation that are magnetic field orientations of the resin magnet.

FIG. 8 is a diagram illustrating the first orientation R1 and the second orientation R2 that are magnetic field orientations of the resin magnet 21. In the example illustrated in FIG. 8, orientations in the xy plane (specifically a plane along the line C4-C4 in FIG. 3), that is, the first orientation R1 and the second orientation R2 are illustrated.

Figure 9:
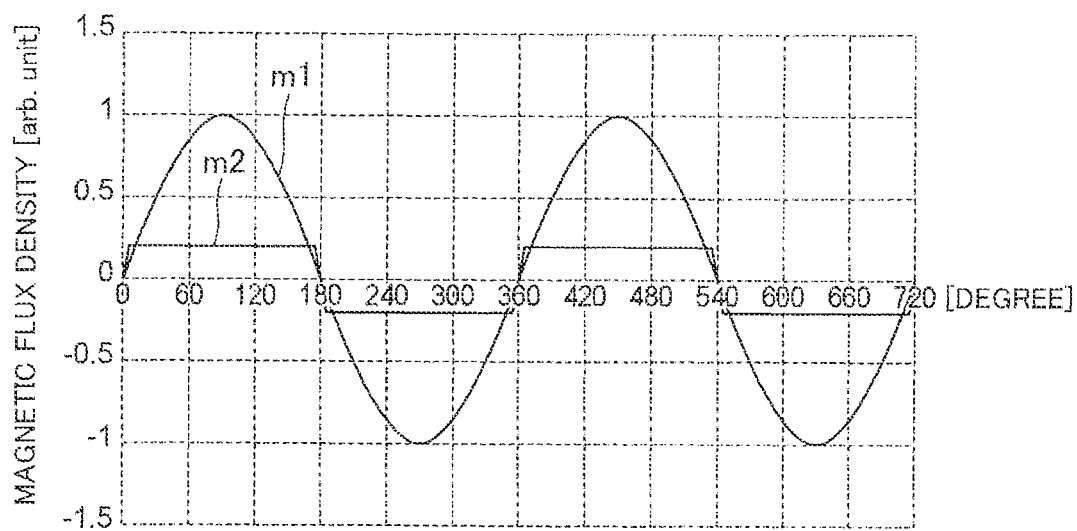
FIG. 9 is a graph showing magnetic flux density distributions from a main magnetic flux generating part and a position detection magnetic flux generating part in a circumferential direction.

FIG. 9 is a graph showing magnetic flux density distributions from the main magnetic flux generating part 21a and the position detection magnetic flux generating part 21b in the circumferential direction. In FIG. 9, the vertical axis represents magnetic flux density [arbitrary unit], and the horizontal axis represents an electrical angle [degree] in the rotor 2.

The main magnetic flux generating part 21a is magnetized so as to have the first orientation R1. In the example illustrated in FIG. 8, the first orientation R1 is a polar anisotropic orientation. The magnetic flux density distribution of the main magnetic flux generating part 21a in the circumferential direction is represented by a waveform m1 in FIG. 9. That is, the main magnetic flux generating part 21a is magnetized so that detection values of magnetic flux detected by the position detection element 4 form a sine wave. That is, the first orientation R1 is an orientation in which detection values of magnetic flux detected by the position detection element 4 form a sine wave.

The position detection magnetic flux generating part 21b is magnetized so as to have the second orientation R2. That is, the main magnetic flux generating part 21a and the position detection magnetic flux generating part 21b have different orientations. For example, the second orientation R2 is different from the first orientation R1 in the radial direction (i.e., the xy plane). In the example illustrated in FIG. 8, the second orientation R2 is an axial orientation. The magnetic flux density distribution of the position detection magnetic flux generating part 21b in the circumferential direction is represented by a waveform m2 in FIG. 9. That is, the position detection magnetic flux generating part 21b is magnetized so that detection values of magnetic flux detected by the position detection element 4 form a rectangular wave. That is, the second orientation R2 is an orientation in which detection values of magnetic flux detected by the position detection element 4 form a rectangular wave.

As illustrated in FIG. 9, a peak of the magnetic flux density represented by the waveform m1 is larger than a peak of the magnetic flux density represented by the waveform m2. The tilt of the waveform m2 in the second inter-pole part B2 (near 180 degrees, 365 degrees, and 540 degrees in FIG. 9) is larger than the tilt of the waveform m1 in the first inter-pole part B1 (near 180 degrees, 365 degrees, and 540 degrees in FIG. 9). In other words, the tilt of the waveform m2 representing the position of the second inter-pole part B2 detected by the position detection element 4 is larger than the tilt of the waveform m1 representing the position of the first inter-pole part B1 detected by the position detection element 4.

That is, in the circumferential direction, a change of orientation of the magnetic flux from the position detection magnetic flux generating part 21b (i.e., from the north pole to the south pole or from the south pole to the north pole) occurs more rapidly than a change of orientation of the magnetic flux from the main magnetic flux generating part 21a (i.e., from the north pole to the south pole or from the south pole to the north pole). Thus, the influence on the magnetic flux of the position detection magnetic flux generating part 21b from the main magnetic flux generating part 21a, that is, noise of the motor 1, can be reduced. In addition, by detecting the position of the second inter-pole part B2 using the position detection element 4, the accuracy of detection of the rotation position of the rotor 2 can be enhanced.

Figure 10:
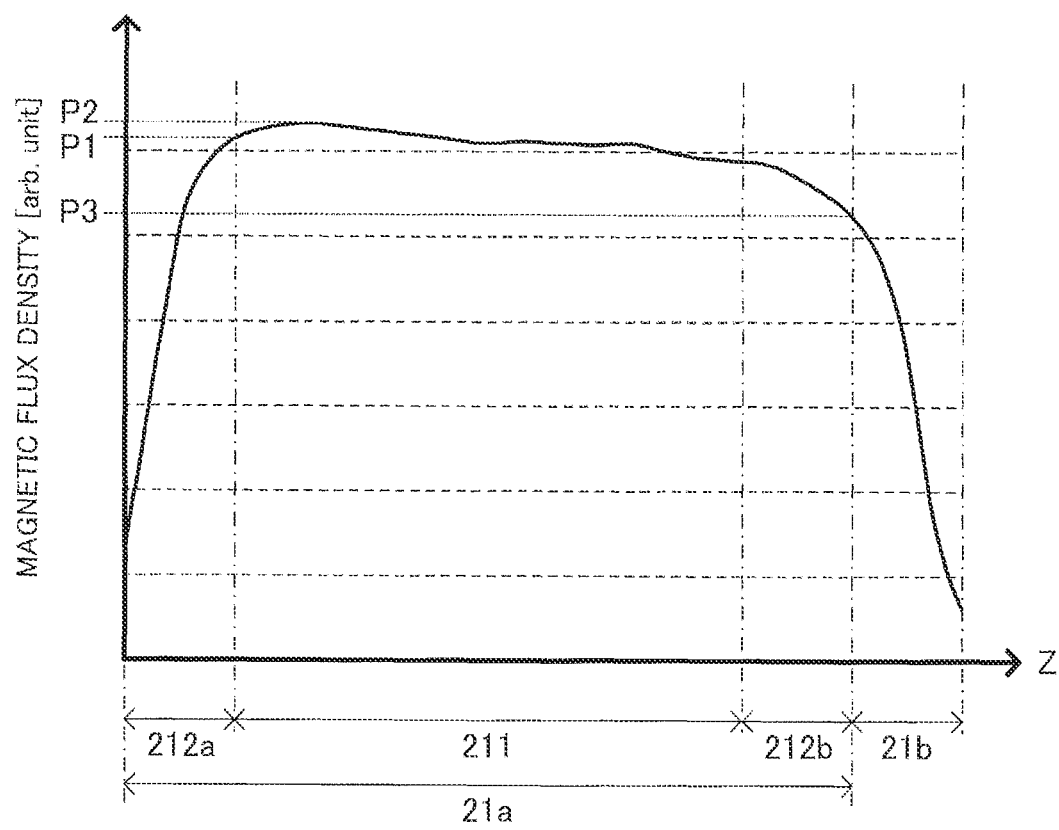
FIG. 10 is a graph showing a magnetic flux density distribution from the resin magnet.

FIG. 10 is a graph showing a magnetic flux density distribution from the resin magnet 21. In FIG. 10, the vertical axis represents magnetic flux density [arbitrary unit] in the radial direction, and the horizontal axis represents a position of the resin magnet 21 in the axial direction.

In molding the resin magnet 21 using a die, in the second region 212b located on a side opposite to the gate, the viscosity of the material for the resin magnet 21 increases, and thus, the magnetic flux density decreases. Thus, a peak P1 of the magnetic flux density from the first region 212a including the gate part 21d is larger than a peak of the magnetic flux density from the second region 212b.

A peak P2 of the magnetic flux density from the main magnetic flux generating part 21a is larger than a peak P3 of the magnetic flux density from the position detection magnetic flux generating part 21b. Accordingly, noise in the motor 1 can be reduced, and the accuracy of detection of the rotation position of the rotor 2 can be enhanced.

The peak P2 of the magnetic flux density from the facing region 211 is larger than the peak P1 of the magnetic flux density from the first region 212a of the non-facing region 212. Magnetic flux from the first region 212a tends to be disturbed in general. However, a relationship between the peaks P1 and P2 satisfies P2>P1, and thus, the magnetic flux flowing from the facing region 211 into the stator core 31 can be increased. As a result, a proportion of the magnetic flux flowing from the facing region 211 into the stator core 31 can be increased, and the influence of disturbance of the magnetic flux from the first region 212a can be reduced.

The peak P1 of the magnetic flux density from the first region 212a of the non-facing region 212 is larger than the peak P3 of the magnetic flux density from the position detection magnetic flux generating part 21b. Accordingly, noise in the motor 1 can be reduced, and the accuracy of detection of the rotation position of the rotor 2 can be enhanced.

The stator 3 includes a stator core 31, a winding 32, and an insulator 33 serving as an insulating part. The stator core 31 is formed of, for example, a plurality of electromagnetic steel sheets. In this case, the plurality of electromagnetic steel sheets are laminated in the axial direction. Each of the plurality of electromagnetic steel sheets is formed in a predetermined shape by punching, and the resulting electromagnetic steel sheets are fixed to each other by caulking, welding, bonding, or the like.

As illustrated in FIG. 1, the motor 1 may include the printed wiring board 40, a lead wire 41 connected to the printed wiring board 40, and the driving circuit 42 fixed to a surface of the printed wiring board 40. In this case, the position detection element 4 is attached to the printed wiring board 40 so as to face the resin magnet 21, specifically, the position detection magnetic flux generating part 21b.

The winding 32 is, for example, a magnet wire. The winding 32 is wound around the insulator 33 combined with the stator core 31 to thereby form a coil. An end portion of the winding 32 is connected to a terminal attached to the printed wiring board 40 by fusing, soldering, or the like.

The insulator 33 is, for example, a thermoplastic resin such as polybutylene terephthalate (PBT). The insulator 33 electrically insulates the stator core 31. The insulator 33 is molded unitedly with the stator core 31, for example. Alternatively, the insulator 33 may be previously molded, and the molded insulator 33 may be combined with the stator core 31.

The driving circuit 42 controls rotation of the rotor 2. The driving circuit 42 is, for example, a power transistor. The driving circuit 42 is electrically connected to the winding 32, and supplies, to the winding 32, a coil current based on a current supplied from the outside or inside (e.g., a battery) of the motor 1. In this manner, the driving circuit 42 controls rotation of the rotor 2.

The position detection element 4 faces the resin magnet 21 in the radial direction. Specifically, the position detection element 4 faces the position detection magnetic flux generating part 21b in the radial direction. The position detection element 4 detects a position of the second inter-pole part B2. Specifically, the position detection element 4 detects a change of orientation of the magnetic flux (i.e., from the north pole to the south pole or from the south pole to the north pole) from the position detection magnetic flux generating part 21b to thereby detect a position of a magnetic pole of the rotor 2, that is, the rotation position of the rotor 2. The position detection element 4 is, for example, a Hall IC.

The resin 5 is, for example, a thermosetting resin such as a bulk molding compound (BMC). The stator 3 and the printed wiring board 40 are united with the resin 5. The position detection element 4 is attached to the printed wiring board 40. Thus, the position detection element 4 is also united with the stator 3 by using the resin 5. The printed wiring board 40 (including the position detection element 4) and the stator 3 will be referred to as a stator assembly. The printed wiring board 40 (including the position detection element 4), the stator 3, and the resin 5 will be referred to as a mold stator.

An example of a method for manufacturing the motor 1 will be described below. The method for manufacturing the motor 1 includes a method for manufacturing the rotor (e.g., steps S4 through S6).

Figure 11:
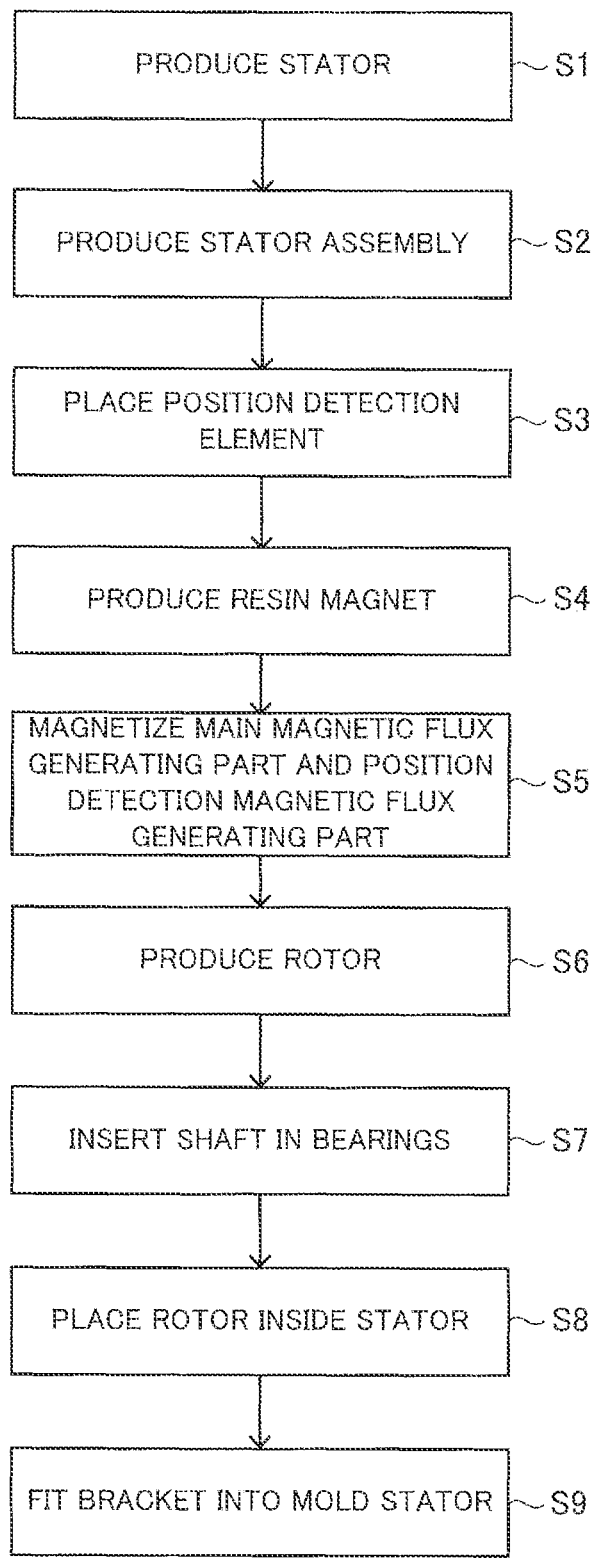
FIG. 11 is a flowchart showing an example of a manufacturing process of a motor.

FIG. 11 is a flowchart showing an example of a manufacturing process of the motor 1. In this embodiment, the method for manufacturing the motor 1 includes steps described below. The method for manufacturing the motor 1, however, is not limited to this embodiment.

In step S1, the stator 3 is produced. For example, the stator core 31 is formed by laminating a plurality of electromagnetic steel sheets in the axial direction. In addition, the previously formed insulator 33 is attached to the stator core 31, and the winding 32 is wound around the stator core 31 and the insulator 33. In this manner, the stator 3 is obtained.

In step S2, a stator assembly is produced. For example, projections of the insulator 33 are inserted in positioning holes of the printed wiring board 40. Accordingly, the printed wiring board 40 is positioned, and a stator assembly is obtained. In this embodiment, the position detection element 4 and the driving circuit 42 are previously fixed to a surface of the printed wiring board 40. The lead wire 41 is also preferably attached to the printed wiring board 40 beforehand. The projections of the insulator 33 projecting from the positioning holes of the printed wiring board 40 may be fixed to the printed wiring board 40 by heat welding, ultrasonic welding, or the like.

In step S3, the position detection element 4 is placed so as to face the resin magnet 21. Specifically, in step S3, the printed wiring board 40 and the stator 3 are united by using the resin 5. In this case, the printed wiring board 40 is placed at a position where the position detection element 4 on the printed wiring board 40 faces the resin magnet 21, specifically, the position detection magnetic flux generating part 21b. For example, the stator 3 and the printed wiring board 40 are placed in a die, and a material for the resin 5 (e.g., a thermosetting resin such as bulk molding compound) is poured into the die. In this manner, a mold stator is obtained.

In step S4, the resin magnet 21 is produced. Magnetic particles such as ferrite or samarium-iron-nitrogen are mixed with a thermoplastic resin such as Nylon 12 or Nylon 6, and the resin magnet 21 is molded by using a die. In this manner, the resin magnet 21 having the structure described above is produced.

Figure 12:
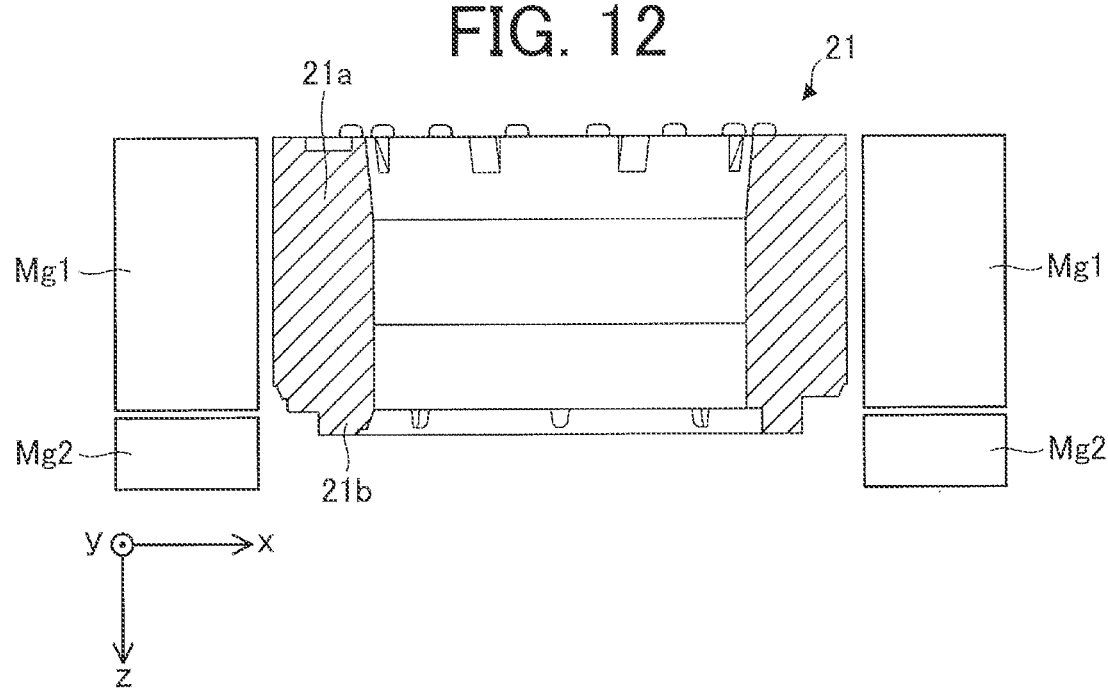
FIG. 12 is a diagram illustrating an example of a magnetization process in a method for manufacturing a motor.

FIG. 12 is a diagram illustrating an example of a magnetization process in step S5.

In step S5, the resin magnet 21 is magnetized. As illustrated in FIG. 12, the permanent magnet Mg1 for magnetization as a first orientation yoke (also referred to as a first magnetization yoke) is disposed so as to face the outer peripheral surface of the main magnetic flux generating part 21a of the resin magnet 21, and a permanent magnet Mg2 for magnetization as a second orientation yoke (also referred to as a second magnetization yoke) is disposed so as to face the position detection magnetic flux generating part 21b of the resin magnet 21 in the radial direction. In this state, the main magnetic flux generating part 21a that is a part of the resin magnet 21 and the position detection magnetic flux generating part 21b that is another part of the resin magnet 21 are magnetized at the same time so as to have the structures described above. That is, the main magnetic flux generating part 21a is magnetized so as to have the first orientation R1 by using the permanent magnet Mg1, and the position detection magnetic flux generating part 21b is magnetized so as to have the second orientation R2 by using the permanent magnet Mg2.

In step S5, a magnetization coil may be used as a first orientation yoke instead of the permanent magnet Mg1, and a magnetization coil may be used as a second orientation yoke instead of the permanent magnet Mg2.

In step S6, the rotor 2 is produced. For example, the shaft 22 is inserted in a shaft hole formed in the resin magnet 21, and the shaft 22 is fixed to the resin magnet 21. The shaft 22 is united with the resin magnet 21 by using, for example, a thermoplastic resin such as polybutylene terephthalate (PBT). In this manner, the rotor 2 is obtained. The resin magnet 21 and the shaft 22 may be made of different materials or may be made of the same material. The resin magnet 21 and the shaft 22 may be integrally formed of the same material.

In step S7, the shaft 22 is inserted in the bearings 6a and 6b.

In step S8, the rotor 2 is inserted, together with the bearings 6a and 6b, into the stator assembly (specifically, the stator 3). In this manner, the rotor 2 (specifically, the resin magnet 21) is placed inside the stator 3.

In step S9, the bracket 7 is fitted into the mold stator (specifically, the resin 5).

The order from step S1 to step S9 is not limited to the order indicated in FIG. 11. For example, steps S1 to S3 and steps S4 to S7 may be performed concurrently. Steps S4 to S7 may be performed prior to steps S1 to S3.

Through the steps described above, the motor 1 is fabricated.

In the motor 1 according to the first embodiment, a peak P2 of the magnetic flux density from the main magnetic flux generating part 21a is larger than a peak P3 of the magnetic flux density from the position detection magnetic flux generating part 21b. Accordingly, noise in the motor 1 can be reduced, and the accuracy of detection of the rotation position of the rotor 2 can be enhanced.

The rotor 2 may have the first orientation R1 and the second orientation R2 that are different from each other. Specifically, since the first orientation R1 is an orientation in which detection values of magnetic flux detected by the position detection element 4 form a sine wave, noise of the motor 1 can be reduced. In addition, since the second orientation R2 is an orientation in which detection values of magnetic flux detected by the position detection element 4 form a rectangular wave, the accuracy of detection of the rotation position of the rotor 2 can be enhanced.

In addition, the tilt of the waveform m2 is larger than the tilt of the waveform m1 near an inter-pole part. That is, a change in an orientation of the magnetic flux from the position detection magnetic flux generating part 21b (i.e., from the north pole to the south pole or from the south pole to the north pole) occurs more rapidly than a change of an orientation of the magnetic flux from the main magnetic flux generating part 21a (i.e., from the north pole to the south pole or from the south pole to the north pole). Thus, by detecting the position of the second inter-pole part B2 using the position detection element 4, the accuracy of detection of the rotation position of the rotor 2 can be enhanced.

In addition, the peak P1 of the magnetic flux density from the first region 212a of the non-facing region 212 is larger than the peak P3 of the magnetic flux density from the position detection magnetic flux generating part 21b. Accordingly, noise in the motor 1 can be reduced, and the accuracy of detection of the rotation position of the rotor 2 can be enhanced.

In addition, the peak P2 of the magnetic flux density from the facing region 211 is larger than the peak P1 of the magnetic flux density from the first region 212a of the non-facing region 212. Accordingly, a proportion of the magnetic flux flowing from the facing region 211 into the stator core 31 can be increased, and the influence of disturbance of the magnetic flux from the first region 212a can be reduced.

Furthermore, the position detection element 4 is disposed so as to face the position detection magnetic flux generating part 21b in the radial direction. Accordingly, the size of the motor 1 can be further reduced. In this case, since the second orientation R2 is a radial orientation, the magnetic flux from the position detection magnetic flux generating part 21b easily flows into the position detection element 4. As a result, the accuracy of detection of the rotation position of the rotor 2 can be enhanced.

If the relationship between r1 and r2 satisfies r1≥r2, in the magnetization process on the main magnetic flux generating part 21a, it is possible to prevent magnetization of the position detection magnetic flux generating part 21b by the permanent magnet Mg1 for magnetization on the main magnetic flux generating part 21a. As a result, the accuracy of detection of the magnetic flux from the position detection magnetic flux generating part 21b, that is, the accuracy of detection of position of a magnetic pole of the rotor 2 (specifically, the resin magnet 21) can be enhanced.

The resin magnet 21 has a projection that is located at a position corresponding to a position of the second inter-pole part B2 in the circumferential direction and projects toward the position detection element 4. Accordingly, when the second inter-pole part B2 of the resin magnet 21 passes by the position detection element 4, the orientation of the magnetic flux flowing into the position detection element 4 can be changed abruptly. That is, it is possible to enhance the accuracy of detection of the second inter-pole part B2 (i.e., a point of change from the north pole to the south pole or from the south pole to the north pole) detected by the position detection element 4. As a result, the accuracy of detection of the rotation position of the rotor 2 (specifically, the resin magnet 21) can be enhanced.

In the method for manufacturing the motor 1 and the method for manufacturing the rotor 2 according to the first embodiment, magnetization on the main magnetic flux generating part 21a and magnetization on the position detection magnetic flux generating part 21b are performed at the same time, and thus, manufacturing processes can be made simple.

Variation

Figure 13:
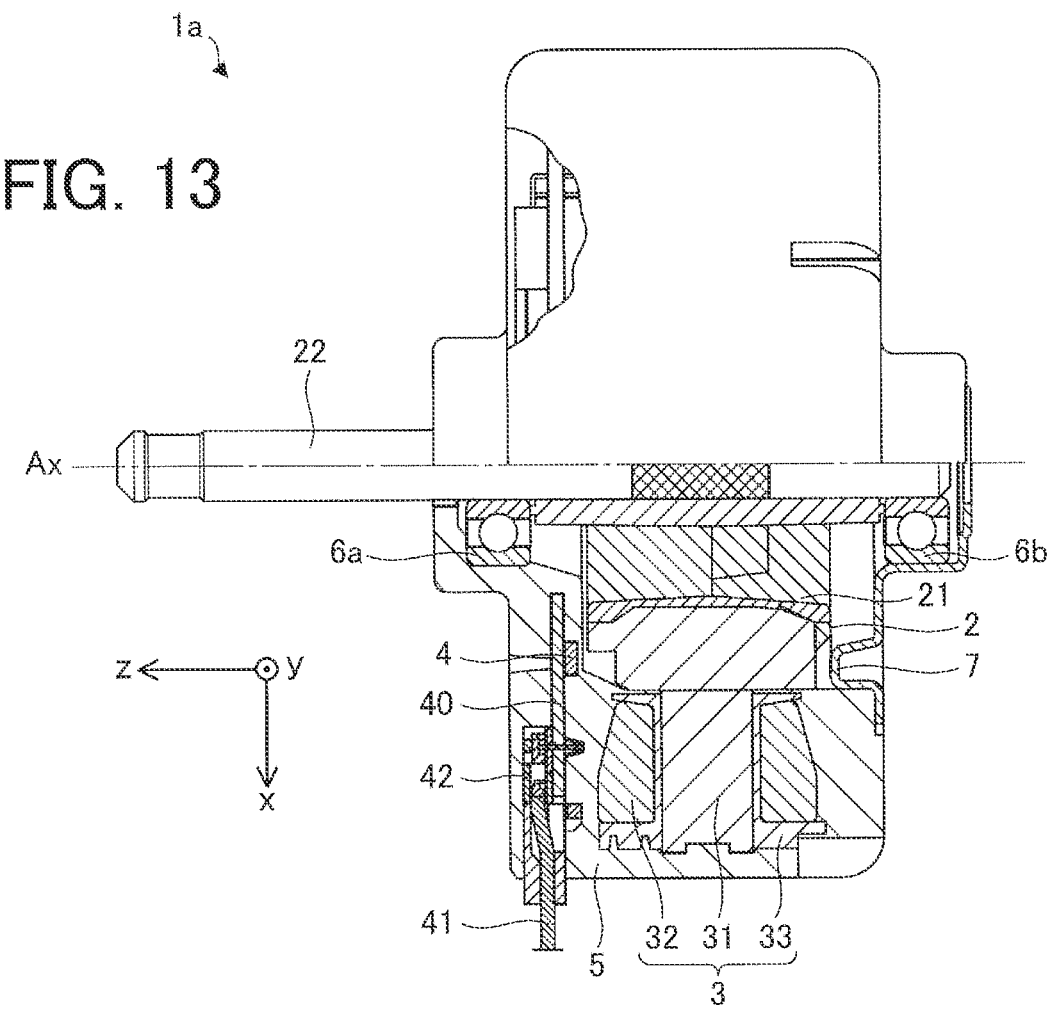
FIG. 13 is a partial cross-sectional view schematically illustrating a structure of a motor according to a variation.

FIG. 13 is a partial cross-sectional view schematically illustrating a structure of a motor 1a according to a variation.

In the motor 1a, the position detection element 4 faces the resin magnet 21 in the axial direction. Specifically, the position detection element 4 faces the position detection magnetic flux generating part 21b in the axial direction. That is, with respect to the position detection element 4 of the motor 1a, the location of the position detection element 4 is different from that of the first embodiment.

Figure 14:
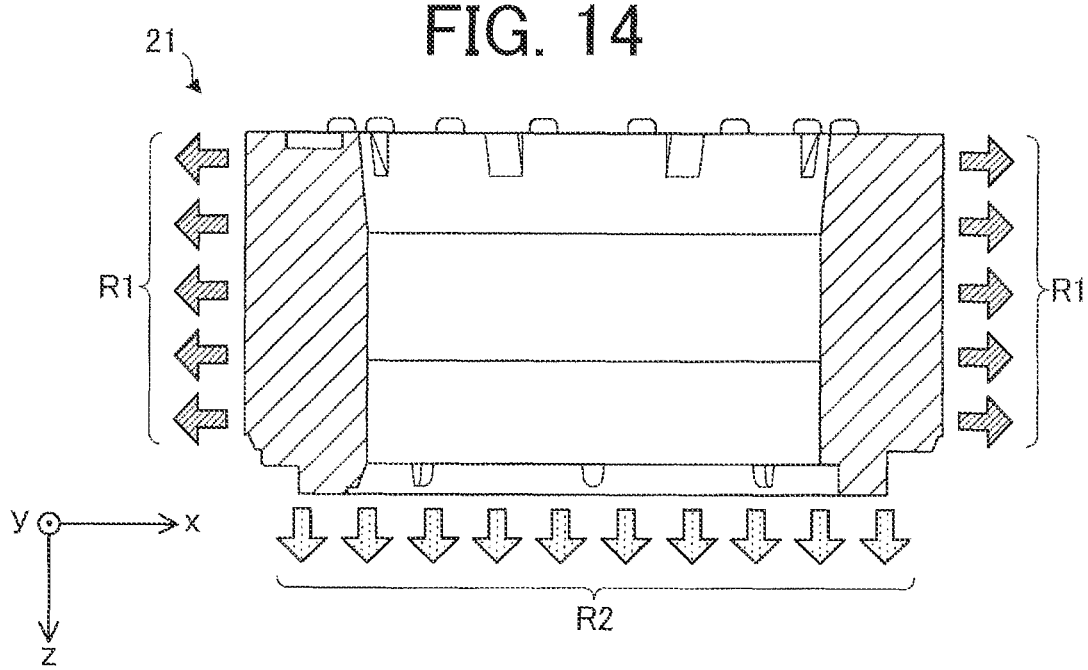
FIG. 14 is a diagram illustrating a first orientation and a second orientation that are magnetic field orientations of a resin magnet in the motor according to the variation.

FIG. 14 is a diagram illustrating a first orientation R1 and a second orientation R2 that are magnetic field orientations of the resin magnet 21 in the motor 1a. In the example illustrated in FIG. 14, magnetic field orientations, that is, the first orientation R1 and the second orientation R2, on an xz plane (specifically, a plane along the line C4-C4 illustrated in FIG. 3) are shown. The second orientation R2 is different from the first orientation R1 in the radial direction. In the motor 1a, the first orientation R1 is a polar anisotropic orientation, and the second orientation R2 is an axial orientation. That is, the motor 1a is different in the second orientation R2 to the first embodiment.

The other features of the motor 1a are the same as those of the first embodiment.

In the motor 1a according to the variation, the same advantages as those described in the first embodiment can also be obtained. In addition, since the position detection element 4 faces the resin magnet 21, specifically, the position detection magnetic flux generating part 21b, in the axial direction, a flow of the magnetic flux from the main magnetic flux generating part 21a into the position detection element 4 can be reduced, and the accuracy of detection of the magnetic flux from the position detection magnetic flux generating part 21b can be enhanced. As a result, the accuracy of detection of the rotation position of the rotor 2 can be enhanced.

In addition, in a case where the position detection element 4 faces the position detection magnetic flux generating part 21b in the axial direction, the position detection element 4 can be attached to the printed wiring board 40. In this manner, the size of the motor 1a can be reduced, and costs for the motor 1a can be reduced.

In the method for manufacturing the motor 1a and the method for manufacturing the rotor 2 according to the variation, the magnetization process of the resin magnet 21 is different from step S5 in the manufacturing process of the motor 1. Specifically, in the method for manufacturing the motor 1a according to the variation, magnetization on the main magnetic flux generating part 21a and magnetization on the position detection magnetic flux generating part 21b are performed separately.

Figure 15:
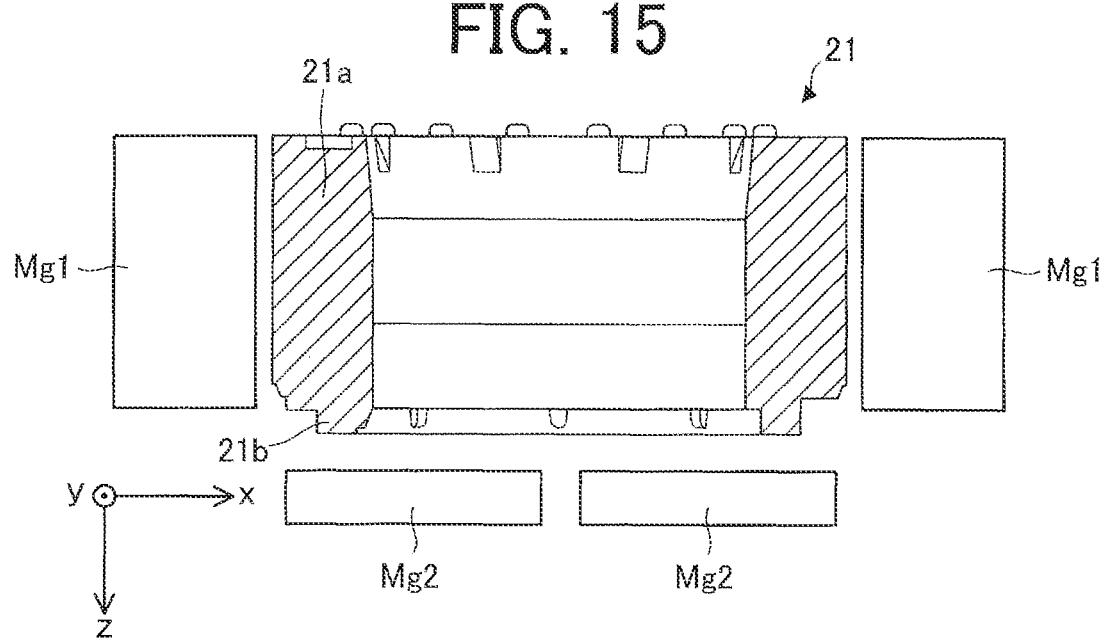
FIG. 15 is a diagram illustrating an example of a magnetization process in a method for manufacturing the motor according to the variation.

FIG. 15 is a diagram illustrating an example of a magnetization process in a method for manufacturing the motor 1a according to the variation.

As illustrated in FIG. 15, in the magnetization process on the main magnetic flux generating part 21a, the permanent magnet Mg1 for magnetization as the first orientation yoke (also referred to as the first magnetization yoke) is placed so as to face the outer peripheral surface of the main magnetic flux generating part 21a of the resin magnet 21, and the main magnetic flux generating part 21a as a part of the resin magnet 21 is magnetized so as to have the first orientation R1 by using the permanent magnet Mg1.

After the magnetization process on the main magnetic flux generating part 21a, the position detection magnetic flux generating part 21b is magnetized. As illustrated in FIG. 15, in the magnetization process on the position detection magnetic flux generating part 21b, the permanent magnet Mg2 for magnetization as the second orientation yoke (also referred to as the second magnetization yoke) is placed so as to face the position detection magnetic flux generating part 21b in the axial direction, and the position detection magnetic flux generating part 21b as another part of the resin magnet 21 is magnetized so as to have the second orientation R2 by using the permanent magnet Mg2.

In this manner, the main magnetic flux generating part 21a that is a part of the resin magnet 21 is magnetized so as to have the first orientation R1, and the position detection magnetic flux generating part 21b that is another part of the resin magnet 21 is magnetized so as to have the second orientation R2 different from the first orientation R1 in the radial direction.

Steps except for the magnetization process on the main magnetic flux generating part 21a and the magnetization process on the position detection magnetic flux generating part 21b are the same as steps S1 to S4 and steps S6 to S9 shown in FIG. 11.

With the method for manufacturing the motor 1a and the method for manufacturing the rotor 2 according to the variation, the step of magnetizing the main magnetic flux generating part 21a having the first orientation R1 and the step of magnetizing the position detection magnetic flux generating part 21b having the second orientation R2 are performed separately, and thus, the first orientation R1 and the second orientation R2 can be clearly distinguished. Specifically, the permanent magnet Mg2 is placed so as to face the position detection magnetic flux generating part 21b of the resin magnet 21 in the axial direction, and the position detection magnetic flux generating part 21b is magnetized. In this manner, magnetic flux density flowing in the axial direction can be increased. As a result, a magnetic force of the resin magnet 21 can be increased, and the accuracy of detection of the rotation position of the rotor 2 (specifically, the resin magnet 21) can be enhanced. In this manner, it is possible to provide the rotor 2 capable of reducing noise of the motor 1a and enhancing the accuracy of detection of the rotation position of the rotor 2.

Second Embodiment

Figure 16:
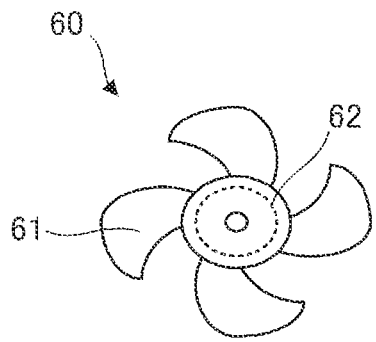
FIG. 16 is a diagram schematically illustrating a structure of a fan according to a second embodiment of the present invention.

FIG. 16 is a diagram schematically illustrating a structure of a fan 60 according to a second embodiment of the present invention.

The fan 60 includes blades 61 and a motor 62. The fan 60 is also referred to as an air blower. The motor 62 is the motor 1 according to the first embodiment (including the variation thereof). The blades 61 are fixed to a shaft (e.g., the shaft 22 in the first embodiment) of the motor 62. The motor 62 drives the blades 61. When the motor 62 is driven, the blades 61 rotate and thus an airflow is generated. Accordingly, the fan 60 can send air.

With the fan 60 according to the second embodiment, the motor 1 described in the first embodiment (including the variation thereof) is applied to the motor 62, and thus, the same advantages as those described in the first embodiment can be obtained. As a result, noise of the fan 60 can be reduced, and control of the fan 60 can be improved.

Third Embodiment

An air conditioning apparatus 50 according to a third embodiment of the present invention will be described.

Figure 17:
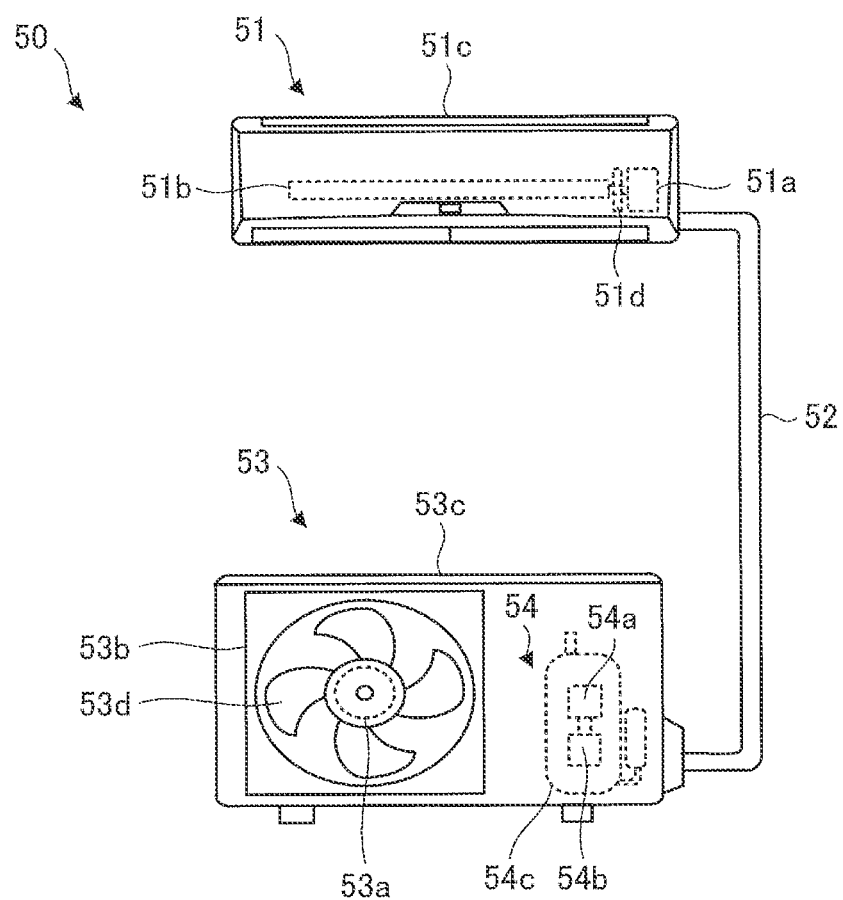
FIG. 17 is a diagram schematically illustrating a configuration of an air conditioning apparatus according to a third embodiment of the present invention.

FIG. 17 is a diagram schematically illustrating a configuration of the air conditioning apparatus 50 according to the third embodiment of the present invention.

The air conditioning apparatus 50 (e.g., a refrigeration air conditioning apparatus) according to the third embodiment includes an indoor unit 51 serving as an air blower (first air blower), a refrigerant pipe 52, and an outdoor unit 53 serving as an air blower (second air blower) connected to the indoor unit 51 by the refrigerant pipe 52.

The indoor unit 51 includes a motor 51a (e.g., the motor 1 according to the first embodiment), an air supply unit 51b that is driven by the motor 51a to thereby send air, and a housing 51c covering the motor 51a and the air supply unit 51b. The air supply unit 51b includes blades 51d that are driven by the motor 51a, for example. For example, the blades 51d are fixed to a shaft (e.g., the shaft 22 in the first embodiment) of the motor 51a, and generate an airflow.

The outdoor unit 53 incudes a motor 53a (e.g., the motor 1 according to the first embodiment), an air supply unit 53b, a compressor 54, and a heat exchanger (not shown). The air supply unit 53b is driven by the motor 53a to thereby send air. The air supply unit 53b includes blades 53d that are driven by the motor 53a, for example. For example, the blades 53d are fixed to a shaft (e.g., the shaft 22 in the first embodiment) of the motor 53a, and generate an airflow. The compressor 54 includes a motor 54a (e.g., the motor 1 according to the first embodiment), a compression mechanism 54b (e.g., a refrigerant circuit) that is driven by the motor 54a, and a housing 54c covering the motor 54a and the compression mechanism 54b.

In the air conditioning apparatus 50, at least one of the indoor unit 51 or the outdoor unit 53 includes the motor 1 described in the first embodiment (including the variation thereof). Specifically, as a driving source of the air supply unit, the motor 1 described in the first embodiment (including the variation thereof) is applied to at least one of the motors 51a or 53a. In addition, as the motor 54a of the compressor 54, the motor 1 described in the first embodiment (including the variation thereof) may be used.

The air conditioning apparatus 50 can perform operations such as a cooling operation of sending cold air and a heating operation of sending warm air from the indoor unit 51. In the indoor unit 51, the motor 51a is a driving source for driving the air supply unit 51b. The air supply unit 51b is capable of sending conditioned air.

In the air conditioning apparatus 50 according to the third embodiment, the motor 1 described in the first embodiment (including the variation thereof) is applied to at least one of the motors 51a or 53a, and thus, the same advantages as those described in the first embodiment can be obtained. Accordingly, noise of the air conditioning apparatus 50 can be reduced, and control of the air conditioning apparatus 50 can be improved. In addition, with the use of the low-cost motor 1, costs for the air conditioning apparatus 50 can also be reduced.

In addition, the use of the motor 1 according to the first embodiment (including the variation thereof) as a driving source of the air blower (e.g., the indoor unit 51) can obtain the same advantages as those described in the first embodiment. Accordingly, noise of the air blower can be reduced, and control of the air blower can be improved. The air blower including the motor 1 according to the first embodiment and blades (e.g., the blades 51d or 53d) driven by the motor 1 can be used alone as a device for sending air. This air blower is also applicable to equipment other than the air conditioning apparatus 50.

In addition, the use of the motor 1 according to the first embodiment (including the variation thereof) as a driving source of the compressor 54 can obtain the same advantages as those described in the first embodiment. Accordingly, noise of the compressor 54 can be reduced, and control of the compressor 54 can be improved.

The motor 1 described in the first embodiment (including the variation thereof) can be mounted on equipment including a driving source, such as a ventilator, a household electrical appliance, or a machine tool, in addition to the air conditioning apparatus 50.

Features of the embodiments described above can be combined as appropriate.

What is claimed is:

1. A rotor, comprising:
a resin magnet including a first magnetic flux generating part having a polar anisotropic orientation and a second magnetic flux generating part having a radial orientation or an axial orientation; and
a shaft fixed to the resin magnet,
wherein a peak of magnetic flux density from the first magnetic flux generating part is larger than a peak of magnetic flux density from the second magnetic flux generating part,
wherein the first magnetic flux generating part includes:
a facing region that faces a stator core of a motor in a radial direction while the resin magnet is disposed inside the stator core, and
a non-facing region that does not face the stator core of the motor in the radial direction while the resin magnet is disposed inside the stator core,
wherein the non-facing region includes:
a first region located on a side opposite to the second magnetic flux generating part in an axial direction, and
a second region located between the second magnetic flux generating part and the facing region in the axial direction, and
wherein a peak of magnetic flux density from the first region is larger than a peak of magnetic flux density from the second magnetic flux generating part.

2. The rotor according to claim 1,
wherein the resin magnet includes gate parts formed at both ends of the resin magnet in an axial direction.

3. The rotor according to claim 2,
wherein positions of the gate parts formed at the both ends of the resin magnet are different from each other in a circumferential direction.

4. A motor comprising:
the rotor according to claim 1; and
a stator.

5. The motor according to claim 4,
further comprising a position detection element to detect a rotation position of the rotor.

6. The motor according to claim 5,
wherein the first magnetic flux generating part has a polar anisotropic orientation, and
wherein the second magnetic flux generating part has a radial orientation.

7. The motor according to claim 6,
wherein the position detection element faces the second magnetic flux generating part in the radial direction.

8. The motor according to claim 5,
wherein the first magnetic flux generating part has a polar anisotropic orientation, and
wherein the second magnetic flux generating part has an axial orientation.

9. The motor according to claim 8,
wherein the position detection element faces the second magnetic flux generating part in an axial direction.

10. The rotor according to claim 1,
wherein in a circumferential direction, a change of an orientation of magnetic flux from the second magnetic flux generating part occurs more rapidly than a change of an orientation of magnetic flux from the first magnetic flux generating part.

11. The rotor according to claim 1,
wherein the resin magnet has a projection formed at a position that coincides with a position of an inter-pole part of the second magnetic flux generating part in a circumferential direction.

12. A fan comprising:
a blade; and
the motor to drive the blade, according to claim 4.

13. An air conditioning apparatus comprising:
an indoor unit; and
an outdoor unit connected to the indoor unit,
wherein at least one of the indoor unit or the outdoor unit includes the motor according to claim 4.

14. The rotor according to claim 1,
wherein the second magnetic flux generating part is located at an end portion of the resin magnet in an axial direction.

15. A rotor, comprising:
a resin magnet including a first magnetic flux generating part having a polar anisotropic orientation and a second magnetic flux generating part having a radial orientation or an axial orientation; and
a shaft fixed to the resin magnet,
wherein a peak of magnetic flux density from the first magnetic flux generating part is larger than a peak of magnetic flux density from the second magnetic flux generating part,
wherein the first magnetic flux generating part includes:
a facing region that faces a stator core of a motor in a radial direction while the resin magnet is disposed inside the stator core, and
a non-facing region that does not face the stator core of the motor in the radial direction while the resin magnet is disposed inside the stator core,
wherein the non-facing region includes:
a first region located on a side opposite to the second magnetic flux generating part in an axial direction, and
a second region located between the second magnetic flux generating part and the facing region in the axial direction, and
wherein a peak of magnetic flux density from the facing region is larger than a peak of magnetic flux density from the first region.

16. The rotor according to claim 15,
wherein the second magnetic flux generating part is located at an end portion of the resin magnet in an axial direction.

17. A motor comprising:
the rotor according to claim 15; and
a stator.

18. A fan comprising:
a blade; and
the motor to drive the blade, according to claim 17.

19. An air conditioning apparatus comprising:
an indoor unit; and
an outdoor unit connected to the indoor unit,
wherein at least one of the indoor unit or the outdoor unit includes the motor according to claim 17.

20. A method for manufacturing a rotor, the rotor including a resin magnet and a shaft, the method comprising:
producing the resin magnet so as to include a first magnetic flux generating part and a second magnetic flux generating part;
magnetizing the first magnetic flux generating part so as to have a polar anisotropic orientation;
magnetizing the second magnetic flux generating part so as to have a radial orientation or an axial orientation; and
fixing a shaft to the resin magnet,
wherein a peak of magnetic flux density from the first magnetic flux generating part is larger than a peak of magnetic flux density from the second magnetic flux generating part,
wherein the first magnetic flux generating part includes:
a facing region that faces a stator core of a motor in a radial direction while the resin magnet is disposed inside the stator core, and
a non-facing region that does not face the stator core of the motor in the radial direction while the resin magnet is disposed inside the stator core,
wherein the non-facing region includes:
a first region located on a side opposite to the second magnetic flux generating part in an axial direction, and
a second region located between the second magnetic flux generating part and the facing region in the axial direction, and
wherein a peak of magnetic flux density from the first region is larger than a peak of magnetic flux density from the second magnetic flux generating part.

21. A method for manufacturing a rotor, the rotor including a resin magnet and a shaft, the method comprising:
producing the resin magnet so as to include a first magnetic flux generating part and a second magnetic flux generating part;
magnetizing the first magnetic flux generating part so as to have a polar anisotropic orientation;
magnetizing the second magnetic flux generating part so as to have a radial orientation or an axial orientation; and
fixing a shaft to the resin magnet,
wherein a peak of magnetic flux density from the first magnetic flux generating part is larger than a peak of magnetic flux density from the second magnetic flux generating part,
wherein the first magnetic flux generating part includes:
a facing region that faces a stator core of a motor in a radial direction while the resin magnet is disposed inside the stator core, and
a non-facing region that does not face the stator core of the motor in the radial direction while the resin magnet is disposed inside the stator core,
wherein the non-facing region includes:
a first region located on a side opposite to the second magnetic flux generating part in an axial direction, and
a second region located between the second magnetic flux generating part and the facing region in the axial direction, and
wherein a peak of magnetic flux density from the facing region is larger than a peak of magnetic flux density from the first region.

* * * * *